United States Patent
Gui et al.

(10) Patent No.: US 7,676,829 B1
(45) Date of Patent: Mar. 9, 2010

(54) MULTIPLE CREDENTIALS IN A DISTRIBUTED SYSTEM

(75) Inventors: Wei-Qiang Michael Gui, Bellevue, WA (US); David Shutt, Bellevue, WA (US); Joseph N. Coco, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1726 days.

(21) Appl. No.: 10/020,470

(22) Filed: Oct. 30, 2001

(51) Int. Cl.
*G06F 7/04* (2006.01)
*G06F 15/16* (2006.01)

(52) U.S. Cl. .................... 726/5; 726/6; 726/8
(58) Field of Classification Search ............ 726/5–9
See application file for complete search history.

(56) References Cited

U.S. PATENT DOCUMENTS

| | | | |
|---|---|---|---|
| 5,560,008 A * | 9/1996 | Johnson et al. ............. | 726/5 |
| 5,604,490 A * | 2/1997 | Blakley et al. ............. | 726/5 |
| 6,065,120 A * | 5/2000 | Laursen et al. ............. | 726/5 |
| 6,178,511 B1 * | 1/2001 | Cohen et al. ............. | 726/6 |
| 6,606,663 B1 * | 8/2003 | Liao et al. ............. | 709/229 |
| 6,609,198 B1 * | 8/2003 | Wood et al. ............. | 713/155 |
| 6,732,277 B1 * | 5/2004 | Vandergeest et al. ......... | 726/19 |
| 6,748,365 B1 * | 6/2004 | Quinlan et al. ............. | 705/14 |
| 6,769,068 B1 * | 7/2004 | Brozowski et al. ............. | 726/5 |
| 6,941,476 B2 * | 9/2005 | Harrison et al. ............. | 726/5 |
| 6,959,336 B2 * | 10/2005 | Moreh et al. ............. | 709/229 |
| 6,986,039 B1 * | 1/2006 | Leah et al. ............. | 713/155 |
| 2001/0034837 A1 * | 10/2001 | Kausik et al. ............. | 713/185 |
| 2002/0016777 A1 * | 2/2002 | Seamons et al. ............. | 705/76 |
| 2002/0023059 A1 * | 2/2002 | Bari et al. ............. | 705/76 |
| 2002/0031230 A1 * | 3/2002 | Sweet et al. ............. | 380/278 |
| 2002/0083012 A1 * | 6/2002 | Bush et al. ............. | 705/76 |
| 2002/0144119 A1 * | 10/2002 | Benantar ............. | 713/171 |
| 2003/0208684 A1 * | 11/2003 | Camacho et al. ............. | 713/186 |

OTHER PUBLICATIONS

J.k. Jan et al., *Two Integrated Schemes of User Authentication and Access Control in a Distributed Computer Network*, IEE Proceedings, Computers and Digital Techniques, vol. 145, No. 6, Nov. 1998, pp. 419-424.

Vinti Doshi, et al., *Using Attribute Certificates with Mobile Policies in Electronic Commerce Applications*, IEEE, 16th Annual Computer Security Application Conference, Dec. 11-15, 2000.

* cited by examiner

*Primary Examiner*—Kimyen Vu
*Assistant Examiner*—Suman Debnath
(74) *Attorney, Agent, or Firm*—Workman Nydegger

(57) ABSTRACT

Systems and methods for associating multiple credentials with a single user account in a distributed authentication system. A user can be authenticated to a service by providing any one of the multiple credentials to the authentication system. Thus, a user can provide credentials that are more easily entered or supplied on a given device. All of the credentials are associated with a single user account. The credentials can be associated symmetrically, where the user account is independent of each credential, or asymmetrically, where the user account is stored with a primary credential and the other credentials are secondary credentials that reference the primary credential.

25 Claims, 4 Drawing Sheets

MULTIPLE CREDENTIALS IN A DISTRIBUTED SYSTEM

BACKGROUND OF THE INVENTION

1. The Field of the Invention

The present invention relates to systems and methods for managing multiple credentials in a distributed system. More particularly, the present invention relates to systems and methods for associating multiple sets of credentials with a user account in a distributed authentication system that allows users to uniquely authenticate themselves using the credentials that are most appropriate to a particular service and/or access device.

2. Background and Relevant Art

The explosive growth of the Internet and related technologies has resulted in a great number of computer based services that are available to consumers. Web portals, instant messaging, and email are examples of those services. In addition to the growth experienced by these services, advancing technology has provided a number of different devices through which these services may be accessed. Generally, these services are accessed through desktop or laptop computers. Increasingly, however, many of these services are being accessed and used through other devices, such as cellular telephones, personal digital assistants (PDAs), and the like.

Many of these computer based services, for both their own protection and for the protection of their users, need to be able to identify or authenticate the users that access or use their services. Often, computer based services perform user identification by requiring the user to provide credentials. Credentials typically include, for example, a combination of a user name and a password that uniquely identify a user to the service. When a user supplies credentials to a computer based service, the computer based service is able to authenticate and verify the user because the computer based service is reasonably sure that only that user is able to provide that particular credential.

One problem that often presents itself in these situations is related to the access devices that are used to access a computer based service. More specifically, the problem is related to the credentials that a user must supply in order to sign or log in to a computer based service. Credentials have to be entered into the access device when a user is signing in to a computer based service. Different devices have different form factors as well as different data input capabilities and while providing credentials on one device may be a relatively straightforward task, providing the same credentials on another device may prove to be a burdensome task.

For example, assume that a user has an email account and that the user is able to access the email account using the following credential:

Username: Joe@emailservice.com
Password: myPAssword.

When the user attempts to access their email account from a desktop computer, the credential can be quickly and easily entered using the keyboard because the user is able to quickly and easily select and enter upper/lower case letters as well as special characters. In contrast, when the user attempts to access their email account from their cellular phone, the task of logging in by entering this credential becomes significantly more difficult. The user is typically required to "triple-tap" on the numbers in order to select each letter in both the username and the password, navigate complex menu systems to select upper/lower case letters, and find symbols such as the "@" character. If the user desires to access their email account from their cellular phone, then the user is required to spend the time needed to enter the credential on the input restricted device because the email account can only be accessed with this credential.

Another problem that is related to credentials is that the user is often required to provide different credentials when accessing different services. In other words, the credentials that are supplied to one service may not be valid credentials at another service. One reason is that the username selected at one service may already be taken by another user at another service. Thus, the user is often required to select a different credential for each service. As a user accumulates more credentials for use with more services, it is more difficult for the user to remember which credentials correspond to which service. Users are thus faced with responsibility of remembering all of their credentials and of using those credentials with devices that have limited data input.

SUMMARY OF THE INVENTION

These and other problems are overcome by the present invention which provides systems and methods for the association of multiple sets of credentials to a single user account. An authentication system is provided that allows a user to be authenticated using different credentials. Thus, a user is able to be authenticated by the authentication system using the credential that is most appropriate for their access device. This enables the user to easily access computer based services using devices that have different form factors, data input techniques, and security capabilities.

When a user provides a credential to the authentication system, the same user identifier is usually returned regardless of which credential was provided to the authentication system. In fact, one advantage of the present invention is that all credentials are usually associated with a single user identifier and all credentials are usually mapped to a single user account. The user identifier uniquely identifies the user to the various computer based services that associate with the authentication system. Because some credentials provide better security that other credentials, the services may require that the user supply a credential to the authentication service that is of sufficient security without being aware of the actual credential that was supplied by the user.

After the credential has been supplied by the user to the authentication system, the authentication system usually sends the supplied credentials to the credential store where the master credentials are actually stored for validation or verification of the supplied credentials. The location of the master credentials can often be inferred from the credentials themselves. For example, credentials that have a particular domain (e.g. foo.com) may be stored in one location while credentials that contain a telephone number may be stored in another location. After validating any given credential, the authentication system can retrieve other credentials for that user.

Another advantage is the ability of the user to have credentials of varying security levels. Because high security credentials are often burdensome to users as well as on the authentication system, a user can associate credentials of varying security levels with a single user account. When a particular site is accessed, the site can specify the level of security that is required. Thus, a user can supply the high security credentials to the authentication system when required even if they have previously logged in to the authentication system using a credential that has a lower level of security.

In addition, it is possible to associate different protection schemes or security measures with different credentials. For example, it is possible to lock a user account if a numerical password is supplied incorrectly a pre-determined number of times. For other credentials, such as a security key, the account may be permanently locked. This permits protection schemes to be implemented on a per credential basis. The effect of the security measures is to prevent the user from being authenticated to a service if the security measure for a particular credential is breached.

Credentials can be associated or stored, for example, symmetrically and/or asymmetrically by the authentication system. In a symmetrical implementation the user account is independent of the user's credentials and the user account can be stored separately from the credentials and/or cached with each credential. In the asymmetrical implementation, one credential is designated as the primary credential in the sense that the user account is physically stored with the primary credential. Using a secondary credential typically redirects the user/application to the primary credential store in the asymmetrical implementation.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Computer based services (services), including Web portals, instant messaging, websites, telephony-based voice mail services and the like, are often accessed from various devices that have, for example, different data input techniques, security capabilities, and form factors. These services, regardless of the device used to access the services, often require that their users be authenticated and uniquely identified. User identification is accomplished by requiring the user to supply credentials, that are presumably only known to the user, to an authentication system that validates the credentials. As previously described, this presents some difficulty to the user because some credentials are particularly difficult to enter on some devices.

The present invention addresses the difficulty of accessing a computer-based service from different devices by providing an authentication system that supports multiple credentials across a distributed system. The complexity of managing multiple credentials is placed on the authentication system and is thus removed from the user. The present invention thus extends to both methods and systems for authenticating a user or a client and to systems and methods for managing multiple credentials in a distributed authentication system. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
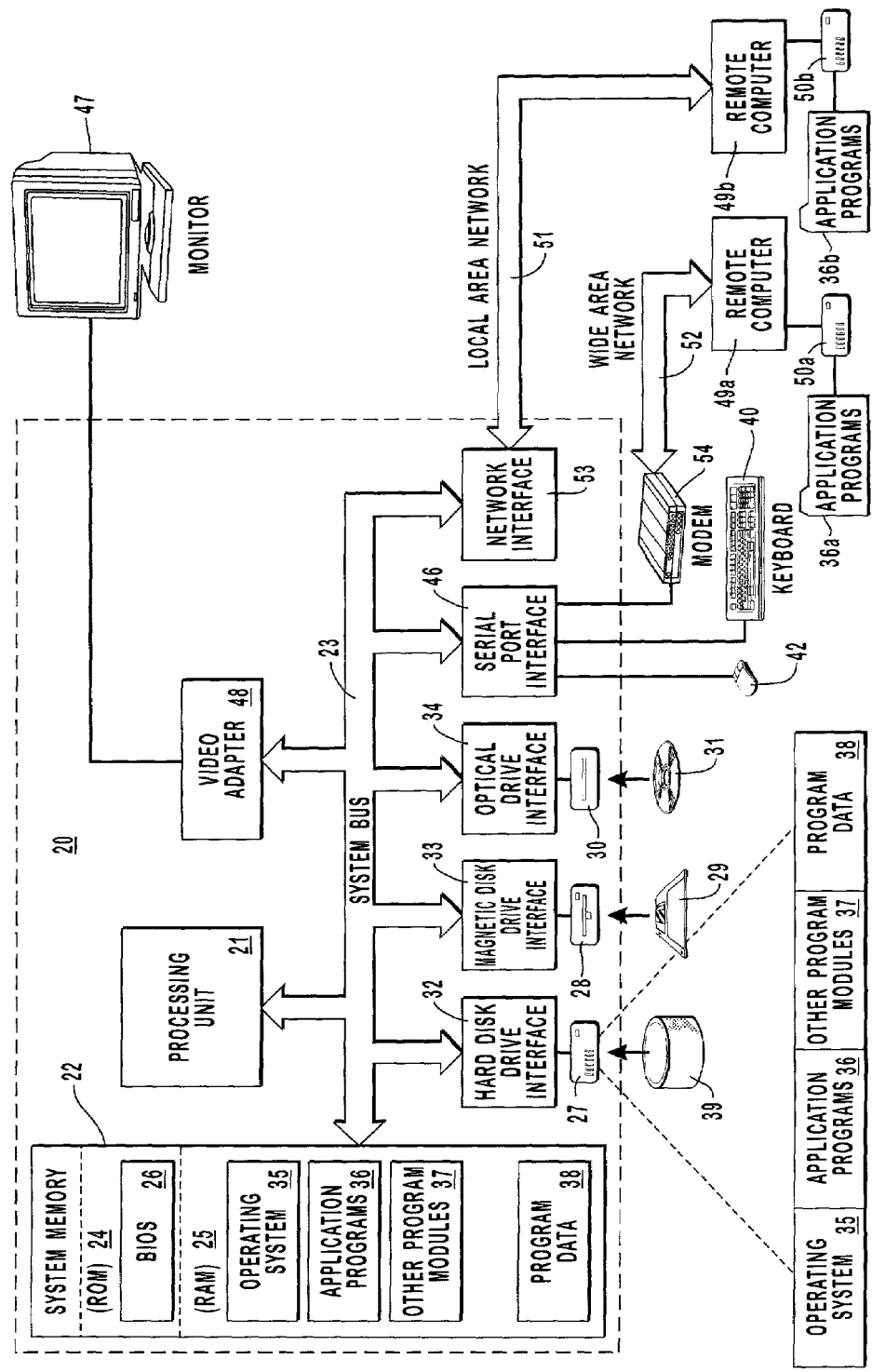
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

As used herein, a service or a computer based service refers to, but is not limited to, a web site or page, web portals, instant messaging, email, telephony based voice mail, and the like. For example, a web site that provides online email for users or instant messaging for users is a service. Similarly, websites that sell products are services. More generally, any site or system that authenticates or uniquely identifies a user is within the scope of the term service. A user may be an individual, a company, an organization, a group of individuals, a website, or any other entity that can be authenticated using credentials as described herein.

A credential refers to the information or data that is used to uniquely identify a user and credentials serve to authenticate users to computer based services. The typical expression of a credential is a user name that is combined with a password. The user name is often an email address or an alias that is selected by the user. For some devices, such as cellular telephones or other input restricted devices, the user name is often numerical owing to the difficulty of inputting non-numerical characters.

The password is typically an alphanumerical string that is also selected by the user. It is preferable to have a variety of different characters (letters and numbers, for example) in the password such that it is more difficult for others to ascertain, but the password is often limited to numbers for some devices (PIN numbers on cell phones, for example) because of the difficulty in entering alpha characters. The complexity and security of the password can be increased when the password is case sensitive or when punctuation or other special characters are included in the password. Another type of credential is a digital certificate and a digital signature.

The following examples illustrate various credentials that may be used to authenticate a user. These credentials are exemplary and the present invention is not limited to these credentials.

Credential 1 (common credential)
    Email: me@myemail.com
    Password: Mypassword
    Credential 2 (numerical credential)
    Phone number: 123-456-7890
    PIN: 123456
    Credential 3 (common credential with security key)
    Email: me@myemail.com
    Password: Mypassword
    Security Key: 987654
    Credential 4 (Digital Certificate Credential)
    Digital Certificate: DATA
    Signature: 324asdf . . . asd9903

One advantage of the present invention is the ability to associate multiple sets of credentials in a distributed authentication system such that a user can uniquely identify themselves to computer-based services using credentials that are most appropriate for a particular computer-based service and/or access device. Thus, a user can obtain access to a particular service when they use one credential from a device such as a cellular telephone and another credential from a different device such as a laptop computer. More specifically, the user can supply a numerical credential (credential 2 in the above examples) when accessing a service from a cellular telephone while using any of the other credentials when accessing the same service from the laptop computer. The user is thus relieved of having to input alphanumerical characters using the limited input capabilities of the cellular telephone while still being authenticated to the various services.

Figure 2:
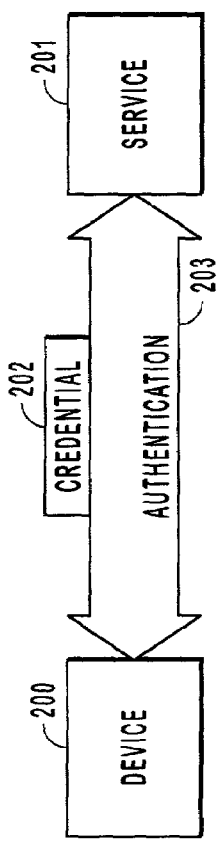
FIG. 2 illustrates a block diagram for authenticating a user to a service.

FIG. 2 is a block diagram that generally illustrates an exemplary system for authenticating a user to a service when the user accesses the service 201 with a device 200. This example assumes that the user has previously registered with the service 201 and that the credentials of the user are stored by the service 201. During authentication 203 of the user to the service 201, the user supplies credentials 202 to the service 201 through the device 200. The service 201, upon receiving the credentials 202 from the device 200, compares the credentials 202 against a store of master credentials. In this manner, the service 201 is able to authenticate the user based on the supplied credentials 202 by comparing the supplied credentials against the master credentials.

Figure 3:
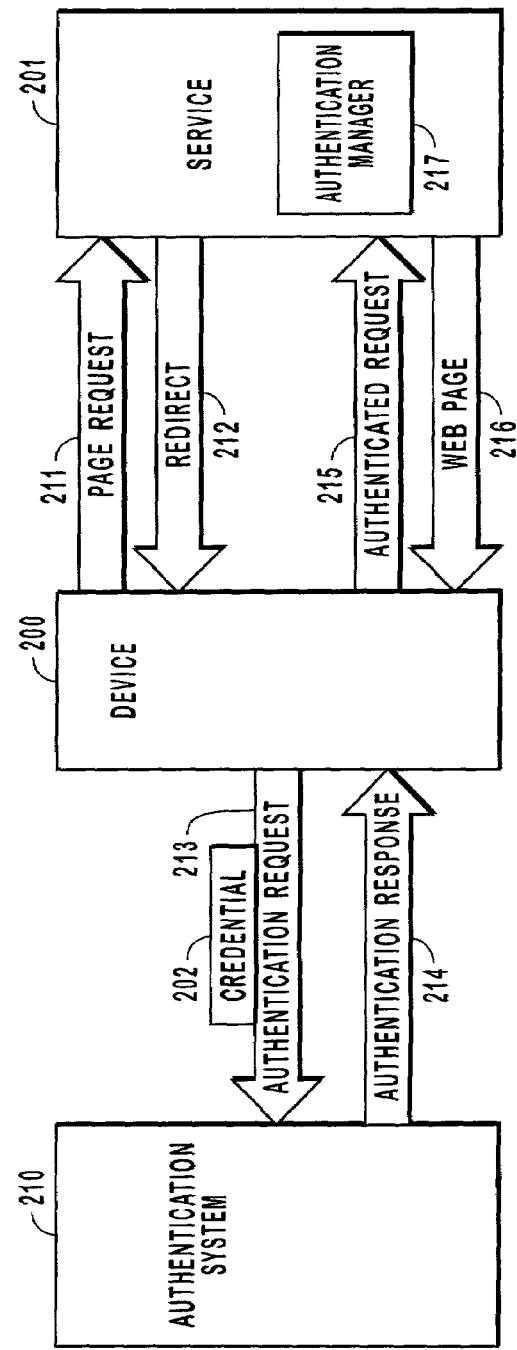
FIG. 3 illustrates a block diagram for authenticating a user to a service through a distributed authentication system.

FIG. 3 is a block diagram that illustrates an exemplary system for authenticating a user with a service through an authentication system that is independent of the service that the user is accessing. The service 201 and the authentication system 210 typically have an association or agreement such that a device 200 can be authenticated to the service 201 by the authentication system 210. The service 201, for example, may have an icon or link that references the authentication system 210. When a user clicks on this icon, the process of authenticating the user to the service 201 through the authentication system 210 is initiated.

In this instance, the device 200 issues a page request 211 to the service 201 (accomplished, for example, by clicking on the icon of the authentication system displayed by the service). The service 201 responds with a redirect 212 and the device 200 issues an authentication request 213 to the authentication system 210. The authentication request 213 typically includes the credentials 202 which are supplied by the user. The credentials 202 comprise, for example, a username and a password as previously described.

The authentication system 210 receives the credentials 203 and if the credentials are successfully validated by the authentication system 210, the authentication system 210 issues an authentication response 214 to the device 200 that includes a user profile and/or a ticket. The user profile and/or the ticket are often sent to the device 200 in one or more cookies and are stored on the device 200. The ticket is usually encrypted and includes a unique user identifier from the authentication system 210. The unique user identifier is specific to the user and the user profile is associated with the unique identifier. The user is often unaware of the user identifier and the service is typically unaware of the credential that was supplied by the user to the authentication system 210.

The device 200 next directs an authenticated request 215 that usually includes the ticket to the service 201. The authenticated request 215 may also include the user profile. The service 201 includes an authentication manager 217 that is able to decrypt the ticket contained in the authenticated request 215. Finally, if authentication is successful, the page that was earlier requested by the device 200 is delivered (216).

The service 201 may use information in the user profile to customize the user's experience at the service 201.

The user may attempt to access subsequent services. At these subsequent services and at the discretion of both the user and/or the subsequent services, a user can be automatically authenticated to these services without further input from the user of the device 200. For example, when a user accesses a subsequent service by clicking on the icon of the authentication system 210 that is displayed at the subsequent service, the redirects previously described still occur, but the authentication system 210 issues encrypted cookies that enables silent re-authentication across different services. Each service has the option of requiring the user to reenter the credentials 202.

In this manner, the authentication system 210 is able to authenticate a user to multiple services using a single user identifier. The present invention allows for users to create more than one credential that are associated with the user account, user identifier, and/or the user profile that is maintained by the authentication system 210. In fact, all credentials are associated with a single user account/user identifier. This enables the user to be correctly identified regardless of the credential that the user supplies. The present invention provides extensibility by allowing new credential types including, but not limited to, username/password, digital signatures, biometric signatures, and the like.

By associating multiple credentials to a single user, a user is able to more easily authenticate themselves to various services from different devices. Thus, when the user desires to access a service from their cellular telephone, the user can enter a numerical credential instead of an alphanumerical credential. This accommodates the limited input capabilities of some devices as previously described.

Some credentials provide better security than other credentials. Numerical credentials, for instance, do not provide as much security as alphanumerical credentials or digital certificates/signatures. However, other security measures can be placed on these credentials. For example, the authentication system may only permit an incorrect credential to be submitted a certain number of times before the credential is disabled or a security key can be added to the credential. One advantage is that each credential can have a different security measure associated with the credential. A user will not be authenticated if a particular security measure for a particular credential is breached. In addition, the user account may be locked.

In another example, the authentication system can remember which credential was used to log in. When the user attempts to access a service that requires additional security, the user can be prompted to provide stronger credentials. Thus, if the user initially logged on to a service by providing a numerical credential to the authentication system, the authentication system may prompt the user to provide, for instance, a digital signature if the user later attempts to access the user's financial data at a different service. Conversely, if a user signs in using a very secure credential, the user is automatically authenticated to other services that do not require as much security.

In other words, this effectively permits a user to use a credential that matches a security level specified by a particular site. If the user logs in using a credential that does not have sufficient security for a particular site, then the user may be prompted to provide a more secure credential. The site will be informed of the security level of the more secure credential (and of the other credential in some cases), but will not typically be informed of the actual credential that was supplied by the user. This enables a user to establish credentials that have different security levels that are all associated with the same user account or with the same user identifier.

Alternatively, the user may be prompted for an additional security key as shown in credential 3(shown previously). Thus, the ability to associate multiple credentials not only facilitates the ability of a user to easily authenticate themselves according to the capabilities of the access device, but they allow for more extensive security measures. In some instances, the security is dependent on the credential supplied by the user.

Figure 4:
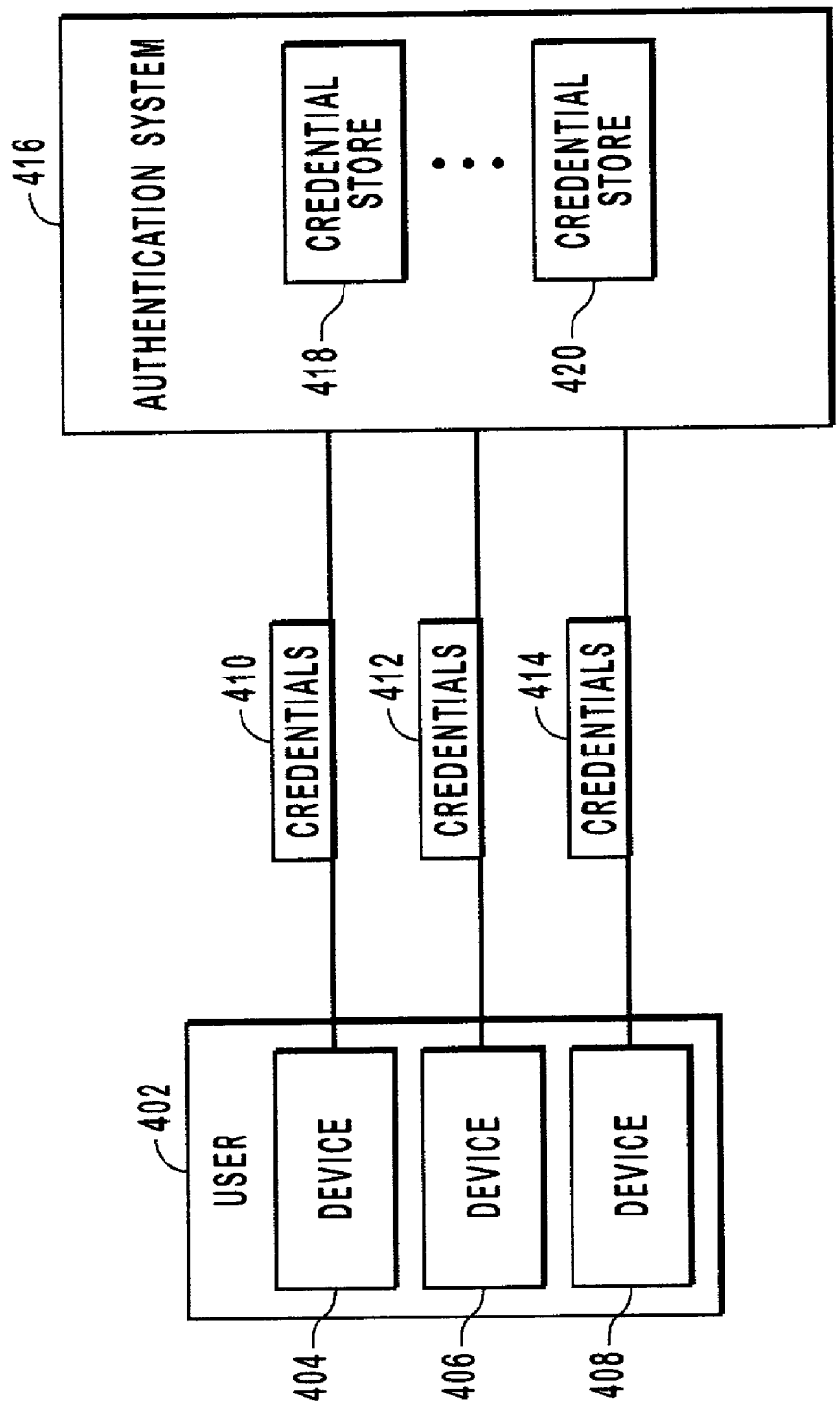
FIG. 4 is a block diagram illustrating how a user can be authenticated by a distributed authentication system using a credential that is most appropriate for a particular device.

FIG. 4 is a block diagram that illustrates how multiple credentials can be used in a distributed authentication system to authenticate a user to various services. FIG. 4 illustrates a user 402 that has one or more access devices that are represented by device 404, device 406, and device 408. The device 404 may be a desktop computer, while the device 406 is a PDA and the device 408 is a cellular telephone. It is understood that the devices referenced in FIG. 4 are not limited to these examples, but also represent other devices such as Internet appliances, pagers, and the like. Note that these devices have varying input capabilities.

When the user 402 is accessing a service, the user 402 is redirected to the authentication system 416 as previously described. The user 402 then provides credentials to the authentication service 416. In this example, the user will supply the credentials 410 when using the device 404, the credentials 412 when using the device 406, and the credentials 414 when using the device 408. The credentials associated with each device may be selected by the user according to the characteristics of each device. If the device 408 is a cellular telephone, then the user 402 will likely select numerical credentials 414. The credentials 414 may be for example, a telephone number and a PIN number. However, the user may provide one of several credentials that will each authenticate the user from each device. It is simply easier to provide a numerical credential from a device that has limited input capabilities such as a cellular telephone.

The authentication system 416, upon receiving the credentials 414 then validates the credentials 414 or in other words, authenticates the user 402. Validation is often accomplished by comparing the credentials supplied with the user against master credentials that are maintained by the authentication system. Because the authentication system 416 is a distributed system, the master credentials of all users are stored on various credential stores, represented as credential store 418 and credential store 420. The credential store that stores the master credentials for the credentials that were supplied by the user can often be determined from the supplied credential as will be described with reference to FIGS. 5 and 6. The authentication system 416 validates the user supplied credentials and issues the authentication response to the device, which may include, a user identifier and/or a user profile.

The user identifier that is supplied by the authentication system 416 and which authenticates the user to the services is the same regardless of the credentials that were supplied by the user 402. Thus, the user is able to associate multiple credentials with a single user identifier or user account. New credentials can be associated with a user identifier and/or a user account by a user. The user accesses the authentication system using one of their credentials and then adds a new credential which is then associated with the user's identifier and/or the user account.

Figure 5:
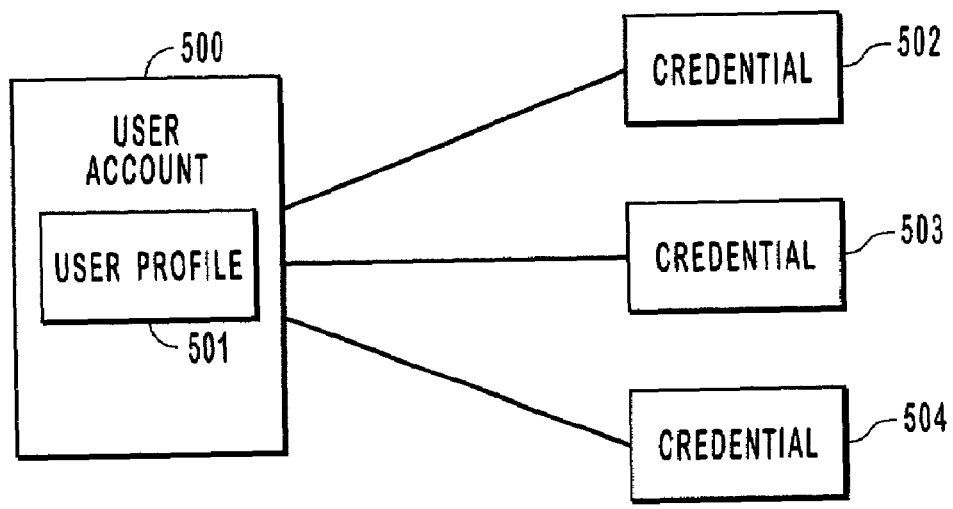
FIG. 5 is a block diagram that illustrates a symmetrical implementation of associating multiple credentials with a user account.
Figure 6:
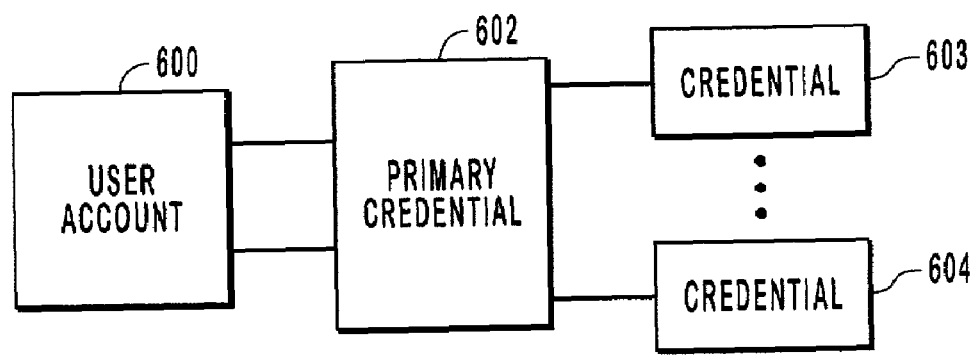
FIG. 6 is a block diagram that illustrates an asymmetrical implementation of associating multiple credentials with a user account.

FIGS. 5 and 6 are block diagrams that provide exemplary associations between multiple credentials in a distributed authentication system. As illustrated in FIG. 5, a user account 500, which is typically maintained by the authentication system, may be accessed through many different credentials. The user account 500 usually has a user profile 501 that includes data about the user such as, but not limited to, first and last names, nickname or alias, gender, date of birth, preferred language, time zone, occupation, secret question and answer (in case the user forgets the password), preferences for sharing the user's email address and name with services that have an association with the authentication system, and the like. The user is also assigned a unique user identifier. The user account 500 can also include credit information, such as credit card numbers and the like such that purchases made by a user on the Internet are accomplished more easily and the user is relieved of repeatedly providing this information for each transaction. The authentication system is able to provide the necessary information to the various services that have an association with the authentication system such that the user is authenticated to those services.

The user account 500, in the example of FIG. 5, is associated with multiple credentials that are represented by credential 502, credential 503, and credential 504 or more specifically, all of the credentials 502, 503, and 504 are all associated with the same user account 500. In some instances, each credential is associated with a particular device. Thus, the credential 502 may be numerical credentials that are used when the access device is a cellular telephone, while the credentials 502 are common credentials (such as alphanumerical username and password) that may be used when the access device is a desktop computer.

In other instances, certain credentials can only be supplied by certain devices. In other words, the authentication system may require that a numerical credential originate from a device such as a cellular telephone. Alternatively, the authentication system may permit credentials to be entered into any device or by a group of devices. In FIG. 5, the user account 500 and/or the user profile 501 is associated with each credential 502, 503, and 504. The user account 500 is independent of any specific credential and the user account 504 can be stored in a central location and/or cached with each credential. Each of the credentials 502, 503, and 504 are master credentials and can be stored on physically separate credential stores. The user account 500 may also be stored on a physically separate store.

In the asymmetrical example of FIG. 6, there is a primary credential 602 and secondary credentials that are represented as credential 603 and credential 604. The user account 600 is associated with a primary credential 602 and the primary credential 602 is typically stored in the same physical location as the user account 600. When a user accesses a service using one of the secondary credentials and is in need of the data contained in the user account 600, the user is redirected to the primary credential store to retrieve the requested data.

In some instances, the primary credential 602 is cached with each of the secondary credentials. This increases the efficiency of navigating from the secondary credential store to the primary credential store. If the primary credential, however, is altered, then each of the cached primary credentials requires an update. This can be accomplished, for example, by maintaining a central directory that stores all of the credentials such that they may be updated if the primary credential is altered.

In general, caching credentials or the user account, in both the symmetrical and asymmetrical implementations, often requires that copies of the credentials or of the user account be updated. This can be accomplished using a directory or by implemented a broadcast mechanism to notify the credential copies. In a distributed authentication system, each of the credentials that is associated with a particular user can be stored in different physical locations, but all of the credentials are linked through a unique user identifier, which may be invisible or unknown to the user. A user can create new credentials by logging or signing in using one of their existing credentials. The user can then enter alternative credentials that are associated with the user identifier (or the user account).

When a user signs or logs in using any one of their multiple credentials, it is usually necessary to send the supplied credential to the location where the master credential is stored in order to validate the credential or authenticate the user. Determining where the authorized credential is stored can be done in various ways. For example, the location can be inferred from the type of credential the user supplies. If the credential includes an email address as the user name, then the domain portion of the email address may indicate the location of the master credential store. Alternatively, master credentials can be stored according to domain names. If the supplied credential is a telephone number, the designated credential store can be inferred from the area code or country code of the telephone number. Alternatively, all of the master credentials can be cached in multiple geographically distinct places that are synchronized.

Another advantage provided by associating multiple credentials is that the authentication system can provide other credentials to the user. For example, when the authentication system validates a numerical credential such as a telephone number and a PIN number, the email address of the user can be retrieved and forwarded to an email service.

Another aspect of the present invention relates to credentials that are similar. For example, many users often have more than one email address. One may be a work email address while the other is a home email address. Both of these email addresses can be associated with a single user account/user identifier maintained by the authentication system. This will permit a service to identify a particular user regardless of which email address is used as a credential. In addition, it also permits other users to add a certain user to an email list even if they do not know, for example, the home email address because both email addresses will be associated with the same user account. This also permits a user to log in to a service using a variety of usernames. Thus not only can a user enter a credential that is most convenient for a particular device, but the user can also use different credentials from any particular device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system including a service that is accessed by a user from one or more devices with varying input capabilities, a method for associating multiple credentials with a single user account such that the user may be authenticated with any one of the multiple credentials, the method comprising an authentication system performing acts of:

receiving an authentication request at the authentication system from a desktop computer, wherein the authentication request includes a first set of credentials of the user, the first set of credentials comprising a username and a password;
   determining based on the first set of credentials being a username and password that a first credential store is to be accessed to validate the authentication request from the desktop computer, the first credential store storing sets of credentials that each comprise a username and password;
   validating the first set of credentials provided by the user by accessing the first credential store to determine whether the username and password are associated with a single unique user identifier, wherein each set of credentials in the first credential store is associated with a single unique user identifier of a user, a single unique user account, and a single unique user profile such that upon determining that the first set of credentials is associated with a unique user identifier, the unique user identifier is returned to the desktop computer such that the desktop computer may use the unique user identifier to access a service;
   receiving a second authentication request at the authentication system from a cellular phone, wherein the authentication request includes a second set of credentials of the user, the second set of credentials comprising a numeric username and a numeric pin, wherein the numeric username is distinct from the username;
   determining based on the second set of credentials being a numeric username and a numeric pin that a second credential store is to be accessed to validate the authentication request from the cellular phone, the second credential store storing sets of credentials that each comprise a numeric username and a numeric pin; and
   validating the second set of credentials provided by the user by accessing the second credential store to determine whether the numeric username and numeric pin are associated with a single unique user identifier, wherein each set of credentials in the second credential store is also associated with a single unique user identifier of a user, a single unique user account, and a single unique user profile such that upon determining that the second set of credentials is associated with the same unique user identifier as the first set of credentials, the unique user identifier is returned to the cellular phone such that the cellular phone may use the unique user identifier to access the service.

2. The method as defined in claim 1 wherein the user selects which set of credentials to provide from among a plurality of sets of credentials valid at the authentication system and associated with the user, the set of credentials being chosen by the user based at least partially on the user's device, the method further comprising:

receiving a new set of credentials from the user and associating the new set of credentials with the unique user identifier, the user account, and the user profile of the user;
   storing the new set of credentials in a credential store of the authentication system such that the authentication system can authenticate the user to the service when the user provides any one of the multiple sets of credentials associated with the user account; and
   providing, in response to the request, the unique user identifier.

3. The method as defined in claim 2, wherein the act of receiving a new set of credentials from the user further comprises storing the new set of credentials in a third credential store based on a type of the new set of credentials.

4. The method as defined in claim 3, wherein storing the new set of credentials further comprises an act of caching a copy of the unique user identifier with the new set of credentials.

5. The method as defined in claim 1, wherein the first set of credentials is a primary set of credentials, the method further comprising associating the second set of credentials with the first set of credentials.

6. The method as defined in claim 2, further comprising one or more of:
   a step for remembering which set of credentials was received in the authentication request;
   a step for prompting the user for a more secure set of credentials when the set of credentials received in the authentication request do not meet security requirements of the service, such that the user selects a new set of credentials from among the plurality of sets of credentials valid at the authentication system; and
   a step for providing at least one security measure for each set of credentials associated with the user account, wherein the user is not authenticated to a service if the security measure of a particular set of credentials is breached or the user account is locked.

7. The method as defined in claim 1, wherein the unique user account corresponds to the service, the method further comprising:
   receiving an authentication response from the authentication system, wherein the authentication response includes the unique user identifier that authenticates the user to the service, the response also including the user profile; and
   sending an authenticated request to the service, wherein the authenticated request includes the unique user identifier and user profile such that access to the service is obtained.

8. The method as recited in claim 2, wherein the new set of credentials has an associated security level and wherein the user has attempted to authenticate using the first set of credentials and wherein the method further comprises:
   associating the new set of credentials with the user account such that the user can be authenticated with any of the plurality of sets of credentials,
   prior to providing the response, and subsequent to receiving the authorization request, prompting the user for a secure set of credentials that is more secure than the first set of credentials if the security level of the first set of credentials is insufficient for a service being accessed by the user, wherein the service is provided with the security level of both the first set of credentials and the secure set of credentials, but is not aware of either the first set of credentials or the secure set of credentials.

9. The method as defined in claim 8, wherein the step for associating the new set of credentials with the user account further comprises a step for symmetrically associating the first set of credentials and the new set of credentials with the user account, wherein the user account is cached with each of the first set of credentials and the set of credentials.

10. The method as defined in claim 9, wherein the step for associating the new set of credentials with the user account further comprises a step for asymmetrically associating the new set of credentials with a primary set of credentials, wherein the primary set of credentials is associated with the user account and wherein the primary set of credentials is cached with each new set of credentials.

11. The method as defined in claim 8, further comprising a step for automatically authenticating the user at different services after the user has been authenticated at a first service.

12. The method as defined in claim 1, wherein the same unique user identifier is provided to the user regardless of the set of credentials received from the user.

13. The method as defined in claim 2, wherein providing the unique user identifier and the user profile to the device comprises sending a cookie containing the unique user identifier and the user profile to the device.

14. The method as defined in claim 1, wherein the user profile includes data about the user comprising name, personal information, preferred language, preferences, and location.

15. The method as defined in claim 2, wherein the act of validating the first and second sets of credentials provided by the user further comprises an act of the authentication system comparing the first and second sets of credentials selected by the user against the plurality of sets of credentials stored in the credential store to determine validity.

16. In a system including a service that is accessed by a user from one or more devices with varying input capabilities, a computer program product for implementing a method for associating multiple credentials with a user account such that the user may be authenticated with anyone of the multiple credentials, the computer program product comprising:
   a computer readable storage medium storing computer readable instructions for performing a method comprising:
      receiving an authentication request at the authentication system from a desktop computer, wherein the authentication request includes a first set of credentials of the user, the first set of credentials comprising a username and a password;
      determining based on the first set of credentials being a username and password that a first credential store is to be accessed to validate the authentication request from the desktop computer, the first credential store storing sets of credentials that each comprise a username and password;
      validating the first set of credentials provided by the user by accessing the first credential store to determine whether the username and password are associated with a single unique user identifier, wherein the each set of credentials in the first credential store is associated with a single unique user identifier of a user, a single unique user account, and a single unique user profile such that upon determining that the first set of credentials is associated with a unique user identifier, the unique user identifier is returned to the desktop computer such that the desktop computer may use the unique user identifier to access a service;
      receiving a second authentication request at the authentication system from a cellular phone, wherein the authentication request includes a second set of credentials of the user, the second set of credentials comprising a numeric username and a numeric pin, wherein the numeric username is distinct from the username;
      determining based on the second set of credentials being a numeric username and a numeric pin that the second credential store is to be accessed to validate the authentication request from the cellular phone, the second credential store storing sets of credentials that each comprise a numeric username and a numeric pin; and
      validating the second set of credentials provided by the user by accessing a second credential store to determine whether the numeric username and numeric pin are associated with a single unique user identifier, wherein the each set of credentials in the second credential store is also associated with a single unique user identifier of a user, a single unique user account, and a single unique user profile such that upon determining that the second set of credentials is associated with the same unique user identifier as the first set of credentials, the unique user identifier is returned to the cellular phone such that the cellular phone may use the unique user identifier to access the service.

17. The computer readable storage medium of claim 16, wherein the user selects which set of credentials to provide from among a plurality of sets of credentials valid at the authentication system and associated with the user, the set of credentials being chosen by the user based at least partially on the user's device, wherein the computer readable instructions further comprise instructions for performing the acts of:
receiving a new set of credentials from the user and associating the new set of credentials with the unique user identifier, the user account, and the user profile of the user;
storing the new set of credentials in a credential store of the authentication system such that the authentication system can authenticate the user to the service when the user provides any one of the multiple sets of credentials associated with the user account; and
providing, in response to the request, the unique user identifier.

18. The computer readable storage medium of claim 17, wherein the act of receiving a new set of credentials from the user further comprises storing the new set of credentials in a third credential store based on a type of the new set of credentials.

19. The computer readable storage medium of claim 18, wherein storing the new set of credentials further comprises an act of caching a copy of the unique user identifier with the new set of credentials.

20. The computer readable storage medium of claim 16, wherein the first set of credentials is a primary set of credentials, the method further comprising associating the second set of credentials with the first set of credentials.

21. The computer readable storage medium of claim 16, wherein the computer readable instructions further comprise instructions for performing the acts of:
remembering which set of credentials was received in the authentication request; and
prompting the user for a more secure set of credentials when the set of credentials received in the authentication request is not sufficient for the service.

22. The computer readable storage medium of claim 16, wherein the unique user account corresponds to a service, and wherein the computer readable instructions further comprise instructions for performing the acts of:
receiving an authentication response from the authentication system, wherein the authentication response includes the unique user identifier that authenticates the user to the service, the response also including the user profile; and
sending an authenticated request to the service, wherein the authenticated request includes the unique user identifier and user profile such that access to the service is obtained.

23. In a system including a service that is accessed by a user from one or more devices with varying input capabilities, a method for associating multiple credentials with a single user account such that the user may be authenticated with any one of the multiple credentials, the method comprising an authentication system performing acts of:
receiving an authentication request at the authentication system from a first computer, wherein the authentication request includes a first set of credentials of the user;
determining based on a format of the first set of credentials that a first credential store is to be accessed to validate the authentication request from the first computer, the first credential store storing sets of credentials that have the same format;
validating the first set of credentials provided by the user by accessing the first credential store to determine whether the first set of credentials is associated with a single unique user identifier, wherein each set of credentials in the first credential store is associated with a single unique user identifier of a user, a single unique user account, and a single unique user profile such that upon determining that the first set of credentials is associated with a unique user identifier, the unique user identifier is returned to the first computer such that the desktop computer may use the unique user identifier to access a service;
receiving a second authentication request at the authentication system from a second computer, wherein the authentication request includes a second set of credentials of the user, the second set of credentials having a format that is different than the format of the first set of credentials;
determining based on the format of the second set of credentials that a second credential store is to be accessed to validate the authentication request from the second computer, the second credential store storing sets of credentials that each have the same format; and
validating the second set of credentials provided by the user by accessing the second credential store to determine whether the second set of credentials is associated with a single unique user identifier, wherein each set of credentials in the second credential store is also associated with a single unique user identifier of a user, a single unique user account, and a single unique user profile such that upon determining that the second set of credentials is associated with the same unique user identifier as the first set of credentials, the unique user identifier is returned to the second computer such that the second computer may use the unique user identifier to access the service.

24. The method of claim 23, wherein the first and second computer are the same computer, and wherein the first set and second set of credentials comprise a username and password, and wherein the username of the first set of credentials is different than the username of the second set of credentials.

25. The method of claim 24, wherein the username of first set of credentials is an email address having a first domain and the username of the second set of credentials is an email address having a second domain that is different than the first domain.

* * * * *